United States Patent
Nagaraj et al.

(10) Patent No.: US 9,900,363 B2
(45) Date of Patent: *Feb. 20, 2018

(54) NETWORK STREAMING OF CODED VIDEO DATA

(71) Applicant: QUALCOMM Incorporated, San Diego, CA (US)

(72) Inventors: Thadi M. Nagaraj, San Diego, CA (US); Ralph A. Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,530

(22) Filed: May 10, 2016

(65) Prior Publication Data
US 2016/0255133 A1 Sep. 1, 2016

Related U.S. Application Data

(63) Continuation of application No. 13/561,075, filed on Jul. 29, 2012, now Pat. No. 9,357,275.
(Continued)

(51) Int. Cl.
G06F 15/16 (2006.01)
H04L 29/06 (2006.01)
(Continued)

(52) U.S. Cl.
CPC ............ H04L 65/607 (2013.01); G11B 27/10 (2013.01); H04L 65/4069 (2013.01);
(Continued)

(58) Field of Classification Search
USPC .......... 709/224, 219, 231; 370/360; 386/278
See application file for complete search history.

(56) References Cited

U.S. PATENT DOCUMENTS 6,240,409 B1 5/2001 Aiken
6,493,709 B1 12/2002 Aiken
(Continued)

FOREIGN PATENT DOCUMENTS

CN 101035262 A 9/2007
CN 102172016 A 8/2011
(Continued)

OTHER PUBLICATIONS

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
(Continued)

Primary Examiner — Tammy Nguyen
(74) Attorney, Agent, or Firm — Shumaker & Sieffert, P.A.

(57) ABSTRACT

In one example, a device configured to receive a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The device is also configured to, after receiving the first sub-segment, receive the second sub-segment, the second sub-segment comprising a second set of one or more data units and a second header including data indicative of locations of the data units within the second sub-segment. The device is also configured to process at least a portion of the segment after receiving the first sub-segment and the second sub-segment.

23 Claims, 5 Drawing Sheets

Related U.S. Application Data

(60) Provisional application No. 61/531,550, filed on Sep. 6, 2011.

(51) Int. Cl.

| | | |
|---|---|---|
| *H04N 21/438* | (2011.01) | |
| *H04N 21/643* | (2011.01) | |
| *H04N 21/845* | (2011.01) | |
| *H04N 21/854* | (2011.01) | |
| *G11B 27/10* | (2006.01) | |
| *H04L 29/08* | (2006.01) | |
| *H04N 21/61* | (2011.01) | |

(52) U.S. Cl.
CPC ......... *H04L 67/02* (2013.01); *H04N 21/4384* (2013.01); *H04N 21/6125* (2013.01); *H04N 21/64322* (2013.01); *H04N 21/845* (2013.01); *H04N 21/8456* (2013.01); *H04N 21/85406* (2013.01)

(56) References Cited

U.S. PATENT DOCUMENTS

| 7,451,177 | B1 | 11/2008 | Johnson et al. | |
|---|---|---|---|---|
| 8,976,858 | B2 | 3/2015 | Nagaraj et al. | |
| 2005/0105515 | A1* | 5/2005 | Reed | H04L 1/0057 370/360 |
| 2006/0218374 | A1* | 9/2006 | Ebert | G01S 13/87 712/5 |
| 2009/0169170 | A1* | 7/2009 | Dunton | G11B 27/034 386/278 |
| 2010/0080290 | A1 | 4/2010 | Mehrotra | |
| 2010/0185776 | A1 | 7/2010 | Hosur et al. | |
| 2011/0080940 | A1 | 4/2011 | Bocharov et al. | |
| 2011/0096828 | A1* | 4/2011 | Chen | H04N 21/23106 375/240.02 |
| 2011/0145430 | A1* | 6/2011 | Ha | H04N 21/23439 709/231 |
| 2013/0060956 | A1 | 3/2013 | Nagaraj et al. | |
| 2013/0091251 | A1* | 4/2013 | Walker | H04N 21/6125 709/219 |
| 2014/0137168 | A1 | 5/2014 | Takahashi et al. | |

FOREIGN PATENT DOCUMENTS

| JP | 2005086362 A | 3/2005 |
|---|---|---|
| JP | 2005117534 A | 4/2005 |
| JP | 2006129078 A | 5/2006 |
| JP | 2013038766 A | 2/2013 |
| WO | WO-2005096270 A1 | 10/2005 |
| WO | 2010078281 A2 | 7/2010 |
| WO | WO-2011038034 A1 | 3/2011 |

OTHER PUBLICATIONS

3GPP TS 26.247 version 10.0.0 Release 10, "Universal Mobile Telecommunications System (UMTS);LTE;Transparent end-to-end Packet-switched; Streaming Service (PSS); Progressive Download and Dynamic; Adaptive Streaming over HTTP (3GP-DASH)", year 2011.

Anonymous: "Information technology. Dynamic adaptative streaming over HTTP (DASH). Part 1: Media Presentation Description and Segment Formats (Text of ISO/IEC DIS 23009-1)", ISO/IEC JTC1/SC29/WG11 (Motion Picture Expert Group), Aug. 30, 2011 (Aug. 30, 2011), pp. i-vi,1-125, XP002687350,Chapter 6 Segment Formats.

Anonymous: "Study text of ISO/IEC 14496-12:200&7DAM 3 DASH support and RTP reception hint track processing", IEEE, No. N11921, Apr. 1, 2011 (Apr. 1, 2011), XP030018414, LIS, Sophia Antipolis Cedex, France ISSN: 0000-0001 section 8.16 Segments.

Fielding et al., "RFC 2616: Hypertext Transfer Protocol HTTP/1.1", Internet Citation, Jun. 1999 (Jun. 1999), pp. 165, XP002196143, Retrieved from the Internet: URL:http://www.rfc-editor-org/ [retrieved on Apr. 15, 2002].

International Organisation for Standardisation, ISO/IEC JTC1/SC29/WG11, Coding of Moving Pictures and Audio, MPEG2010 Geneva, Jan. 6, 2011, "WD 0.1 of 23001-6 Dynamic Adaptive Streaming over HTTP (DASH)," authors Stockhammer et al., 16 pp.

International Search Report and Written Opinion—PCT/US2012/053375—ISA/EPO—dated Dec. 11, 2012.

ISO/IEC JTC 1/SC 29, ISO/IEC FCD 23001-6, Information technology—MPEG systems technologies—Part 6: Dynamic adaptive streaming over HTTP (DASH), Jan. 28, 2011.

QUALCOMM Incorporated: "Discussion Paper on DASH Industry Profile including codecs and other interoperability components (S4-110880)", 3GPP Draft; 3rd Generation Partnership Project (3GPP SA WG4), Nov. 5, 2011 (Nov. 5, 2011), pp. 1-10, XP050577907, Jeju Island, Korea; Nov. 7-11, 2011 Section 3 Low-Latency Live Profile.

Sodagar I., "The MPEG-DASH Standard for Multimedia Streaming over the Internet", IEEE Multimedia, vol. 18, No. 4, Apr. 1, 2011 (Apr. 1, 2011), pp. 62-67, XP011378371, ISSN: 1070-986X, DOI: 10.1109/MMUL.2011.71.

Tokumo Y., et al.,"DASH: segment availability for low-latency live streaming", 100. MPEG Meeting; Apr. 30, 2012-Apr. 5, 2012; Geneva; (Motion Picture Expert Group or ISO/IEC JTC1/SC29/WG11),, No. m24795, Jun. 7, 2012 (Jun. 7, 2012), XP030053138, Section 2.2 Proposed Solution: partial availability of segment.

Anonymous: "Text of ISO/IEC DIS 23001-6 Dynamic adaptive streaming over HTTP", Motion Picture Expert Group or ISO/IEC JTC1/SC29/WG11, Jan. 28, 2011 (Jan. 28, 2011), XP017835090, 86 pages.

\* cited by examiner

NETWORK STREAMING OF CODED VIDEO DATA

This application is a continuation of U.S. patent application Ser. No. 13/561,075, filed Jul. 29, 2012, which claims the benefit of U.S. Provisional Application No. 61/531,550, filed Sep. 6, 2011, which are hereby incorporated by reference in their entireties.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as ITU-T H.264/AVC. Such packetized video data may be transported in a variety of ways, such as transmission over a computer network using network streaming.

SUMMARY

In general, this disclosure describes techniques for streaming media data over a network. More specifically, aspects of this disclosure relate to reducing latency associated with streaming media data over a network, e.g., in accordance with Dynamic Adaptive Streaming over HTTP (DASH). In an example, the techniques of this disclosure include optimizing transmissions of segments of media data. That is, according to aspects of this disclosure, a device responsible for providing media data (e.g., a server device) may divide a segment of media data into a plurality of sub-segments that are suitable for transmission in a network setting. In this example, the server device may transmit a sub-segment of media data as soon as the sub-segment has been formed.

In an example, a method includes receiving a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The method also includes, after receiving the first sub-segment, receiving the second sub-segment, the second sub-segment comprising a second set of one or more data units and a second header including data indicative of locations of the data units within the second sub-segment, and processing at least a portion of the segment after receiving the first sub-segment and the second sub-segment.

In another example, an apparatus for receiving multimedia data comprises one or more processors. The one or more processors are configured to receive a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The one or more processors are also configured to, after receiving the first sub-segment, receive the second sub-segment, the second sub-segment comprising a second set of one or more data units and a second header including data indicative of locations of the data units within the second sub-segment. The one or more processors are also configured to process at least a portion of the segment after receiving the first sub-segment and the second sub-segment.

In another example, an apparatus for receiving multimedia data comprises means for receiving a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The apparatus also comprises means for, after receiving the first sub-segment, receiving the second sub-segment, the second sub-segment comprising a second set of one or more data units and a second header including data indicative of locations of the data units within the second sub-segment. The apparatus also comprises means for means for processing at least a portion of the segment after receiving the first sub-segment and the second sub-segment.

In another example, a computer program product comprises a computer-readable medium having stored thereon instructions that, when executed, cause one or more processors to receive a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The instructions also cause the one or more processors to, after receiving the first sub-segment, receive the second sub-segment, the second sub-segment comprising a second set of one or more data units and a second header including data indicative of locations of the data units within the second sub-segment. The instructions also cause the one or more processors to process at least a portion of the segment after receiving the first sub-segment and the second sub-segment.

In another example, a method includes sending a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The method also includes, after sending the first sub-segment, sending the second sub-segment, the second sub-segment comprising a second set of one or more data units and a second header including data indicative of locations of the data units within the second sub-segment.

In another example, an apparatus for sending multimedia data comprises one or more processors. The one or more processors are configured to send a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The one or more processors are also configured to, after sending the first sub-segment, send the second sub-segment, the second sub-segment comprising a second set of one or more data units and a second header including data indicative of locations of the data units within the second sub-segment.

In another example, an apparatus for sending multimedia data comprises means for sending a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The apparatus also comprises means for, after sending the first sub-segment, sending the second sub-segment, the second sub-segment comprising a second set of one or more data units and a second header including data indicative of locations of the data units within the second sub-segment.

In another example, a computer program product comprises a computer-readable medium having stored thereon instructions that, when executed, cause one or more processors to send a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The instructions also cause the one or more processors to, after sending the first sub-segment, send the second sub-segment, the second sub-segment comprising a second set of one or more data units and a second header including data indicative of locations of the data units within the second sub-segment.

The details of one or more examples are set forth in the accompanying drawings and the description below. Other features, objects, and advantages will be apparent from the description and drawings, and from the claims.

DETAILED DESCRIPTION

Figure 1:
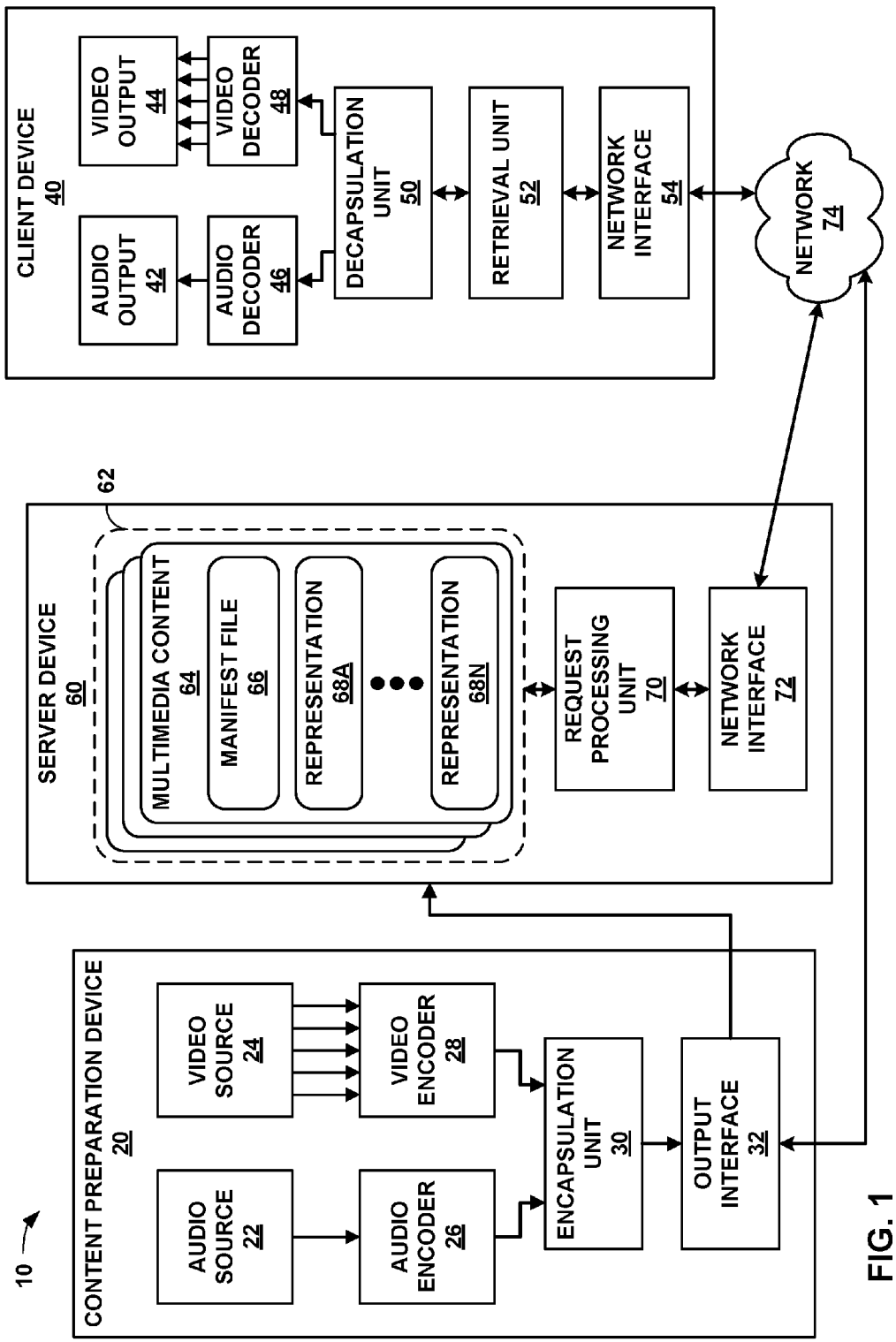
FIG. 1 is a block diagram illustrating an example system that implements techniques for streaming media data over a network.

In general, this disclosure describes techniques for streaming multimedia data, such as audio and video data, over a network. The techniques of this disclosure may be used in conjunction with Dynamic Adaptive Streaming over HTTP (DASH). This disclosure describes various techniques that may be performed in conjunction with network streaming, any or all of which may be implemented alone or in any combination. As described in greater detail below, various devices performing network streaming may be configured to implement the techniques of this disclosure.

In accordance with DASH and similar techniques for streaming data over a network, multimedia content (such as a movie or other audio/video content, which may also include text overlays or other data) may be encoded in a variety of ways and with a variety of characteristics. A content preparation device may form multiple representations of the same multimedia content. Each representation may correspond to a particular set of characteristics, such as coding and rendering characteristics, to provide data usable by a variety of different client devices with various coding and rendering capabilities. Moreover, representations having various bitrates may allow for bandwidth adaptation. That is, a client device may determine an amount of bandwidth that is currently available and select a representation based on the amount of available bandwidth, along with coding and rendering capabilities of the client device.

In some examples, a content preparation device may indicate that a set of representations has a set of common characteristics. The content preparation device may then indicate that the representations in the set form an adaptation set, in that representations in the set can be used for bandwidth adaptation. In some instances, an adaptation set may also be referred to as an "adaptation set." That is, representations in the set may differ in bitrate, but otherwise share substantially the same characteristics. In this manner, a client device may determine various sets of common characteristics for adaptation sets of multimedia content, and select an adaptation set based on coding and rendering capabilities of the client device. Then, the client device may adaptively switch between representations in the selected adaptation set based on bandwidth availability.

The content preparation device may also provide separate network locations for different portions of a manifest file, such as a media presentation description (MPD) file in a format prescribed by 3GPP (Third Generation Partnership Project). That is, different portions of the manifest file may be independently addressable by, e.g., various uniform resource identifiers (URIs), such as uniform resource locators (URLs). An initial portion of the manifest file may include a URI, URL, or other location identifier of another portion of the manifest file. For example, a first portion of the manifest file may include descriptions of common characteristics of adaptation sets, as discussed above.

Each of the adaptation sets may be associated with a respective different portion of the manifest file, which may include data indicative of locations of media data of representations in the respective adaptation set. In this manner, a client device may receive the first portion of the manifest file, select an appropriate adaptation set, retrieve another portion of the manifest file for the selected adaptation set, select a representation of the selected group, and use the other portion of the manifest file to retrieve data of the selected representation. Moreover, the client device may adapt to changing network bandwidth using the other portion of the manifest file, that is, the portion specific to the selected adaptation set.

Video files, such as segments of representations of media content, may conform to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. The ISO Base Media File format is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A representation (motion sequence) may be contained in several files, sometimes referred to as segments. Timing and framing (position and size) information is generally in the ISO base media file and the ancillary files may essentially use any format. This presentation may be 'local' to the system containing the presentation, or may be provided via a network or other stream delivery mechanism.

An optional metadata track can be used to tag each track with the "interesting characteristic" that it has, for which its value may differ from other members of the group (e.g., its bit rate, screen size, or language). Some samples within a track may have special characteristics or may be individually identified. One example of the characteristic is the synchronization point (often a video I-frame). These points may be identified by a special table in each track. More generally, the nature of dependencies between track samples can also be documented using metadata. The metadata can be structured as a sequence of file format samples, just like a video track. Such a track may be referred to as a metadata track. Each metadata sample may be structured as a metadata statement. There are various kinds of statements, corresponding to the various questions that might be asked about the corresponding file-format sample or its constituent samples.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file associated a given uniform resource locator (URL) or other identifier, e.g., URI. The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media representation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media representation may correspond to a structured collection of data that is accessible to an HTTP streaming client device. The HTTP streaming client device may request and download media data information to present a streaming service to a user of the client device. A media representation may be described in the MPD data structure, which may include updates of the MPD.

Multimedia content may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by various characteristics, such as encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group, which may be indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL). The MPD may provide the identifiers for each segment. In some examples, the MPD may also provide byte ranges in the form of a range attribute, which may correspond to the data for a segment within a file accessible by the URL or URI.

Each representation may also include one or more media components, where each media component may correspond to an encoded version of one individual media type, such as audio, video, and/or timed text (e.g., for closed captioning). Media components may be time-continuous across boundaries of consecutive media segments within one representation.

Typically, a segment that conforms to the DASH standard generally has three parts including (1) a fixed header, (2) a table of pointers to data units, and (3) the data units themselves. In an example, a segment may be formed according to Table 1, shown below:

TABLE 1

SEGMENT OF MEDIA DATA

Header
Fixed Table Header
Table of pointers
    Offset of Data Unit 1 = 10
    Offset of Data Unit 2 = 100
    Offset of Data Unit N = . . .
Data Unit 1
Data Unit 2 . . .
Data Unit N Typically, a device responsible for transmitting a segment (e.g., a server device) cannot transmit a segment header until the sizes of all of the data units are known, so that the device can properly construct the table of pointers. Accordingly, the server device generally assembles the data units and pointers, generates the header, and transmits the fully formed segment as a single unit. Alternatively, in response to partial GET requests, the server may transmit portions (e.g., specified byte ranges) of the segment. However, outside the techniques of this disclosure, the server device would receive partial GET requests after the segment has been fully formed, e.g., after a media fragment random access (MFRA) box, which is typically placed at the end of a segment, has been constructed. That is, in order for a client device to submit a partial GET request, the client device would need access to data of the MFRA box, or a similar data structure, having indicators of locations of particular portions of the segment, e.g., indications of byte locations of network abstraction layer (NAL) units of a particular type, such as instantaneous decoder refresh (IDR) pictures.

Moreover, a device that receives a segment of media data (e.g., a client device) typically cannot process the segment until the segment header and all of the data units have been received. Accordingly, the client device generally receives a fully formed segment (e.g., with the entire header, table of pointers, and data units) prior to decoding and displaying the segment. Alternatively, a client device may retrieve portions of a segment (e.g., one or more specified byte ranges), using data of the MFRA box, as explained above. However, again, accessing specific byte ranges of a segment by client devices, outside the techniques of this disclosure, is performed only after the segment has been fully formed.

In examples in which an entire segment is formed prior to transmitting the segment over the network (and received prior to decoding), a one segment latency between transmission of the segment and decoding/playback of the segment is introduced. That is, the server device fully forms an entire segment and transmits the segment to the client device. The client device receives the fully formed segment and uses the header data and pointers to decode and display the full segment. Accordingly, a full segment of latency is introduced, as the server device forms a full segment and the client device receives a full segment prior to playback.

In an example, for purposes of illustration, a segment may contain one second of video data, in playback time. That is, a sever device may package (e.g., encode) a full second of video data in a segment and transmit the second-long segment to a client device. The client device then receives the header and all of the data units of the second-long segment and decodes the entire segment prior to displaying the segment. Accordingly, a one second latency may be introduced, as the client device does not begin decoding/playback until the full segment has been received.

Aspects of this disclosure are generally directed to reducing latency associated with streaming one or more segments of media data. In an example, the techniques of this disclosure include optimizing a transmission schedule for a segment of media data. That is, according to aspects of this disclosure a device responsible for transmitting a segment over a network (e.g., a server device, as described in greater detail with respect to FIG. 1 below) may divide a segment of media data into a plurality of sub-segments that are suitable for transmitting over the network. In this example, the server device may transmit a sub-segment of media data as soon as the sub-segment has been formed. That is, the server device does not have to wait for multiple sub-segments to be formed prior to transmitting a sub-segment. Moreover, the server device does not have to wait for header data for all of the sub-segments to be generated prior to transmitting a sub-segment.

In some examples, such sub-segments may not be independently decodable. That is, one sub-segment may not necessarily be decoded without reference information contained in another sub-segment, which may correspond to a sub-segment that follows the previous sub-segment. In other words, a sub-segment may refer to a future sub-segment. Sub-segments may, however, contain certain information that is independently decodable. For example, sub-segments may contain one or more I-frames of video data that are independently decodable.

According to aspects of this disclosure, a sub-segment may include a sub-segment header and one or more data units. The sub-segment header may include a table of pointers that point to the data units of the sub-segment. As noted above, however, the data units of the sub-segment may refer to a previous sub-segment or a future sub-segment. For example, a data unit of a sub-segment may include a P or B frame (or P or B slice) that references a frame (or slice) of a previous or future sub-segment. That is, a data unit of a sub-segment may be predicted relative to a data unit of a subsequent sub-segment of the same segment. This type of predictive relationship represents one example of a data unit of a first sub-segment of a segment that refers to a second sub-segment of the segment, where the first sub-segment may be received by a client device before the second sub-segment.

In some examples, each sub-segment may include a sub-segment header. For example, a sub-segment header may include a "fixed" portion, such as video/audio encoding format, quality level, and the like. In some instances, the header data of the segments, as well as the data of the sub-segment headers may not change between segments and/or sub-segments. Accordingly, in some aspects of this disclosure, a server device may set, and a client device may interpret, a value of a flag that indicates whether the header data has changed. For example, a server device may set a flag to "0" to indicate that the segment or sub-segment header includes substantially similar or the same data as a previous segment or previous sub-segment. The server device may set a flag to "1" to indicate that the segment or sub-segment header has changed. Moreover, a client device may receive the flag and interpret whether header data has changed from one segment to another.

Generating a plurality of sub-segments of video data and transmitting the sub-segments as soon as they have been formed/encoded may reduce latency (e.g., latency associated with transmitting, receiving, decoding, and/or displaying media data in a streaming environment). For example, a client device may immediately start decoding at least a portion of a sub-segment upon receiving the sub-segment. That is, while certain data units of a sub-segment may reference data units of other sub-segments that have not yet been received, a client device may immediately start decoding some of the data units (e.g., I-frames contained in a sub-segment). Moreover, the client device is ready to decode and play out an entire segment upon receiving the header for the segment, which typically follows the sub-segments.

In some examples, generating a plurality of sub-segments and transmitting a sub-segment as soon as it has been formed in accordance with aspects of this disclosure may be more efficient than simply reducing overall segment duration. That is, in the example provided above for purposes of illustration, a segment may include one second of video data, which may introduce a full second of latency. That is, a full second of latency may be introduced if the segment is fully formed prior to transmission, and the segment is fully received and decoded prior to playback. One way to reduce the latency may be to decrease the overall duration of the segment. That is, rather than encoding and transmitting a one second segment, the server device may encode and transmit a 500 millisecond segment. Accordingly, in this example, end to end latency may be reduced from one second to 500 milliseconds.

Reducing latency by reducing segment duration, however, may increase the proportion of overhead data in the bitstream (e.g., thereby decreasing efficiency). For example, as noted above, each segment contains a header that contains a fixed portion, as well as a portion that increases in size with the number of video/audio samples generated in the segment duration. As segment duration decreases, the fixed portion of the header begins to contribute to a larger portion (proportionally) of the overhead associated with transmitting the data. Given a certain bit rate, increasing the overhead reduces the overall efficiency, because as fewer bits may be used for the actual media data.

Moreover, in some examples, segment of media data may be constructed to avoid reference to another segment. That is, each segment of multimedia content, in some examples, does not reference data of other segments (e.g., a P frame or B frame of one segment does not reference a frame of another segment), and may therefore be independently decodable. Accordingly, in such examples, when reducing segment duration, the number of I-frames is increased while the number of P-frames and B-frames is reduced. Video data having proportionally more I-frames takes does not take advantage of temporal redundancies, for example, as much as video data having a greater proportion of P- and/or B-frames. Thus, for a given average rate, there may be an inverse relationship between the number of I-frames and the perceptual quality of the displayed video data. That is, video data that has been coded using a variable bit rate generally exhibits a higher perceived quality than for video data that has been coded using a more constant bit rate.

Accordingly, aspects of this disclosure may be used to maintain a given segment duration (having a given rate), while also reducing latency. That is, in the one second segment duration example described above, aspects of this disclosure relate to maintaining the one second segment duration while also reducing latency associated with transmitting and decoding/displaying the segment to less than one second. In this way, the perceived quality of the media data may be maintained while also reducing latency.

The techniques of this disclosure may be used for transmitting multimedia data in accordance with DASH or other streaming network protocols via a broadcast network transmission. For example, a server device may prepare segments having a plurality of sub-segments for transmission to one or more client devices via broadcast. A client device may, in some examples, receive a broadcast network transmission that includes sub-segments of a segment, as discussed above.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

As with many video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Video compression standards such as ITU-T H.261, H.262, H.263, MPEG-1, MPEG-2, H.264/MPEG-4 part 10, and the upcoming High Efficiency Video Coding (HEVC) standard, make use of motion compensated temporal prediction to reduce temporal redundancy. The encoder, such as video encoder 28, may use a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures may use the reference picture before the current picture in temporal order. In a B-picture, each block of the B-picture may be predicted from one or two reference pictures. These reference pictures could be located before or after the current picture in temporal order.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, according to some aspects of this disclosure, encapsulation unit 30 may be configured to form sub-segments of data in accordance with the techniques described herein. That is, for example, encapsulation unit 30 may be configured to divide a segment of media data into a plurality of sub-segments. Encapsulation unit 30 may provide a sub-segment to output interface 32 as soon as the sub-segment has been formed. Output interface 32 may then send the sub-segment to client device 40 via network 74.

In such examples, encapsulation unit 30 may generate sub-segments that are not independently decodable. That is, encapsulation unit 30 may generate a sub-segment that may not necessarily be decoded without reference information (e.g., predictive information) contained in another sub-segment, which may correspond to a sub-segment that follows the previous sub-segment. Predictive information of the following sub-segment may comprise pixel data of blocks or slices of the following sub-segment, used to predict the previous sub-segment, in this example. In other words, encapsulation unit 30 may form a sub-segment that refers to a future sub-segment.

Encapsulation unit 30 may generate a segment header that applies to all sub-segments of a segment, as well as a sub-segment header for each of the sub-segments included in a segment. As described in greater detail below, the sub-segment header may contain a table of pointers that identify the locations of data units within the sub-segment. Moreover, encapsulation unit 30 may set a flag that indicates whether segment header data has changed (e.g., whether segment header data is different than a previously generated segment).

In some examples, representations 68 may be separated into adaptation sets. As noted above, in some instances, an adaptation set may also be referred to as a "representation group." That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 72. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets, in accordance with the techniques of this disclosure. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Aspects of this disclosure are generally directed to minimizing latency associated with streaming one or more segments of media data from server device 60 to client device 40 over network 74. That is, according to aspects of this disclosure, server device 60 may divide a segment of media data into a plurality of sub-segments that are suitable for transmitting over network 74. In this example, server device 60 may transmit a sub-segment as soon as the sub-segment has been formed. That is, server device 60 does not have to wait for more than one sub-segment to be formed prior to transmitting a sub-segment. Moreover, server device 60 does not have to wait for header data for all of the sub-segments to be generated prior to transmitting a sub-segment.

It should be understood that certain functions attributed to server device 60, such as sub-segment formation and/or transmission, may be carried out by one or more other components or devices. That is, in another example, content preparation device 20 may be responsible for forming and sending sub-segments over network 74. Additionally or alternatively, according to some examples, content preparation device 20 and server device 60 may be highly integrated or incorporated into the same device. Thus, content preparation device 20, server device 60, or a combination of such devices may prepare and send sub-segments to a client device, such as client device 40, as soon has the sub-segments have been formed. Moreover, such devices may send the sub-segments in a broadcast or multicast network transmission.

Client device 40 may be configured to receive a sub-segment that has been formed according to aspects of this disclosure and immediately start decoding at least a portion of the sub-segment. That is, while certain data units of the sub-segment may reference data units of other sub-segments that have not yet been received, client device 40 may immediately start decoding some of the data units (e.g., I-frames contained in a sub-segment). A data unit of one sub-segment may reference a subsequent data unit of a subsequent sub-segment in that a block may include a motion vector that points to the subsequent data unit, in some examples. Moreover, client device 40 is ready to decode and play out an entire segment upon receiving the header for the segment, which typically follows the sub-segments. That is, client device 40 typically receives all of the sub-segments of a segment prior to receiving the header for the segment.

Generating a plurality of sub-segments of video data and transmitting the sub-segments as soon as they have been encoded may reduce latency associated with transmitting the segments by server device 60, as well as receiving, decoding, and/or displaying the segments by client device 40.

Figure 2:
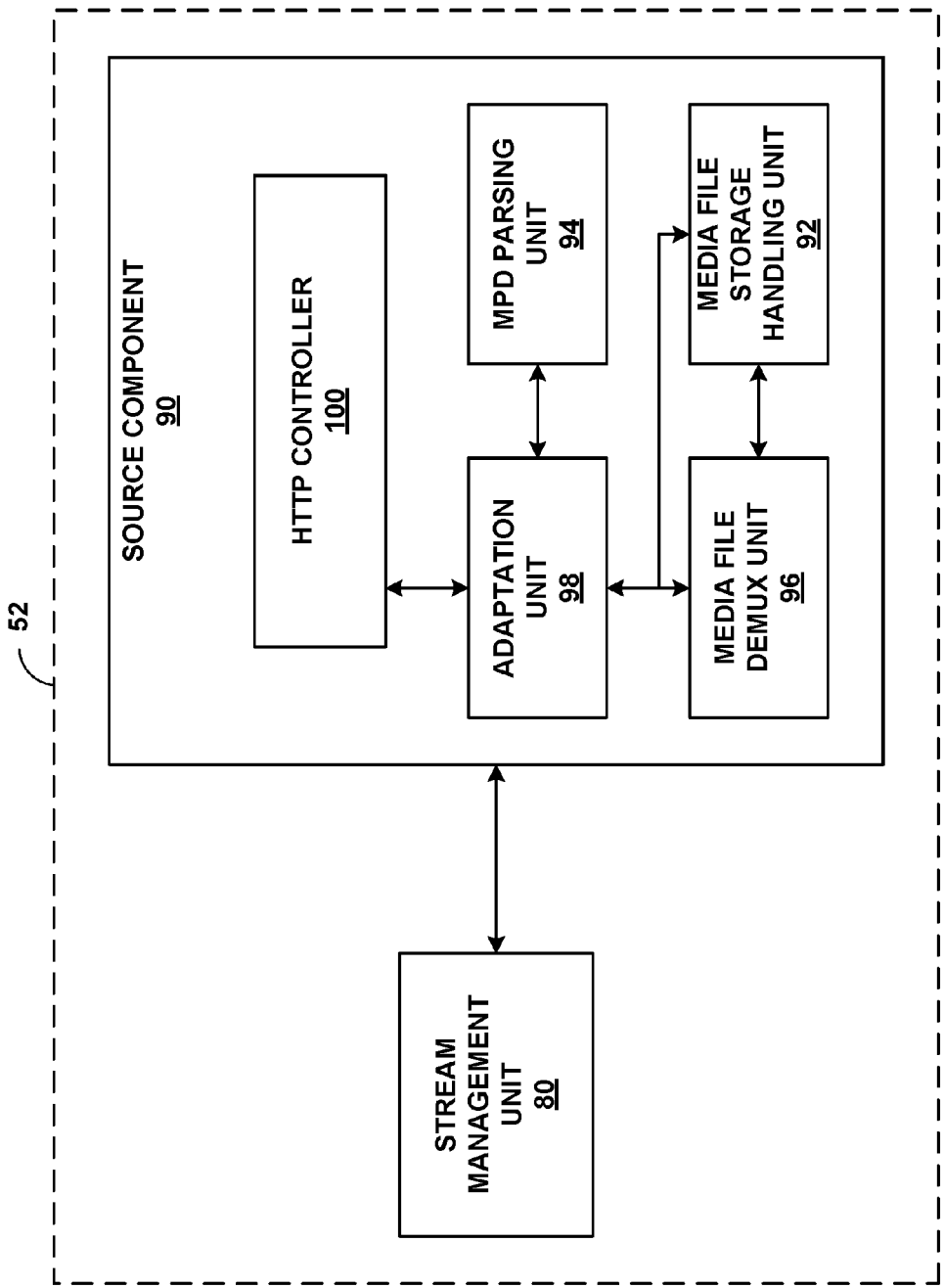
FIG. 2 is a block diagram illustrating an example retrieval unit, according to aspects of this disclosure.

FIG. 2 is a block diagram illustrating example components associated with retrieval unit 52. Retrieval unit 52 of FIG. 2 may correspond to retrieval unit 52 (FIG. 1) or be included in another, different retrieval device. In this example, retrieval unit 52 includes stream management unit 80 and source component 90. Source component 90 includes media file storage handling unit 92, MPD parsing unit 94, media file demultiplexing (demux) unit 96, and adaptation unit 98 and HTTP controller 100.

In general, retrieval unit 52 may include hardware and/or software for communicating using specific communication protocols or interacting with specific physical media. For example, retrieval unit 52 may implement HTTP and receive data using the HTTP stack, which may include TCP/IP as well as other communication protocols for other layers of the network. Retrieval unit 52 may further generate HTTP Get or partial Get requests for segments (or portions of segments) from, e.g., server device 60. Retrieval unit 52 may also implement a broadcast or multicast protocol, such as eMBMS or IP multicast, to receive data from broadcast or multicast network transmissions. Retrieval unit 52 may be configured to subscribe to a broadcast or multicast network transmission in order to retrieve data of the transmission.

Source component 90 may receive data of multimedia content from one or more sources. Initially, source component 90 may receive a manifest file, such as an MPD file. MPD parsing unit 94 may parse the MPD file to determine available representations of the multimedia content, as well as adaptation sets including groups of the representations with common characteristics, and characteristics of the representations. Occasionally, source component 90 may receive an updated MPD for the current multimedia content, in which case MPD parsing unit 94 may parse the updated MPD and provide the updated information to stream management unit 80. In some examples, source component 90 may select at least one of the representations, while in other examples, source component 90 may provide the representation information to stream management unit 80. In such examples, stream management unit 80 may select at least one of the representations. In any case, source component 90 may send a request to stream management unit 80 to send download information for retrieving data for the multimedia content.

Stream management unit 80 may be configured to select a source from which to retrieve data of the selected representation. Stream management unit 80 may, in some examples, receive certain notifications indicating that stream management unit 80 is to select a particular source from which to retrieve the data. For example, an HTTP receiver and stack may provide an estimated amount of available network bandwidth to stream management unit 80 for HTTP transmissions. A broadcast receiver and stack may provide indications of whether a URL for a broadcast transmission corresponding to the selected representation is available and whether the broadcast is in coverage. A local storage device may provide an indication of whether a URL is available for locally stored data corresponding to the selected representation. In addition, stream management unit 80 may receive radio signal strength information (RSSI) from one or more radios of a wireless device, such as client device 40, to determine the strength of a radio signal, e.g., for receiving network data.

Stream management unit 80 may analyze the source notifications received to select one or more of the sources from which to retrieve data for the multimedia content. In some examples, stream management unit 80 also selects a representation of the multimedia content. Stream management unit 80 may receive information from source component 90, such as representation characteristics extracted from an MPD file and URLs for segments of the representations. The information may further include indications of buffer occupancy and/or available space, as well as a current playback time of the multimedia content. Using this information, along with received source notifications, stream management unit 80 may select a source from which to retrieve data for the multimedia content, e.g., data of a currently selected representation. Stream management unit 80 may adaptively switch between representations and/or sources from which to retrieve data for the representations over time for the same multimedia content.

Stream management unit 80 may provide indications of a selected source (and in some cases, a selected representation) to source component 90. In addition, stream management unit 80 may formulate a download command including information for retrieving data of the selected representation from the selected source. For example, the download command may include an indication of a source type and source-specific information. For example, for HTTP/1.1, the download command may specify the full path of a URL of a segment of the selected representation to be included in a Get or partial Get command. As another example, for a broadcast or multicast network transmission, the download command may specify the network address of a broadcast or multicast group to receive a segment of the selected representation. In this manner, stream management unit 80 may determine an appropriate source from which to retrieve data, as well as an appropriate segment of a representation to receive, based on information received from source component 90 and/or other received information.

Source component 90 may formulate an appropriate command to retrieve the data of the selected representation from the selected source, based on the download command information received from stream management unit 80. For example, source component 90 may generate an HTTP Get or partial Get request, a request to join a broadcast or multicast group, or a request to retrieve data of a local storage medium.

In the example of FIG. 2, source component 90 includes media file demultiplexing (demux) unit 96, which may demultiplex the received data, e.g., into respective audio and video streams. Media file storage handling unit 92 may buffer received data in a memory (not shown) of a device including retrieval unit 52. Media file storage handling unit 92 may also provide demultiplexed data to, e.g., audio decoder 46 and video decoder 48 (FIG. 1). Alternatively, media file storage handling unit 92 may provide retrieved media data to client device 40 without demultiplexing the data.

Accordingly, retrieval unit 52 may be configured to operate according to different communication protocols. For example, retrieval unit 52 may comprise a network interface configured to operate according to transmission control protocol/Internet protocol (TCP/IP). The same network interface (e.g., a different element of the network interface), or a different interface, may be configured to receive data according to IP multicast or eMBMS, or other broadcast or multicast network protocols. Another interface of retrieval unit 52 may be configured to receive data from a physical medium. Such an interface may comprise a universal serial bus (USB) interface, a DVD reader, a Blu-ray player, or other such interfaces for retrieving data from a physical medium.

In examples in which retrieval unit 52 is receiving data according to HTTP, adaptation unit 98 may communicate with HTTP controller 100 to perform bandwidth adaption. For example, adaptation unit 98 may communicate with HTTP controller 100 and select, from a manifest file for multimedia content, a representation from which to retrieve multimedia data of the multimedia content. The manifest file may include information indicative of a plurality of representations of the multimedia content, and the plurality of representations may include the selected representation. In particular, the manifest file may include information describing bitrates of the representations, such that adaptation unit 98 may select an appropriate representation based on bitrates of the representations given a currently available amount of network bandwidth. Of course, it should be understood that as explained above, a stream management unit may also be configured to select the representation, rather than the source component. Moreover, the source component and the stream management unit may be functionally integrated, in some examples.

Figure 3:
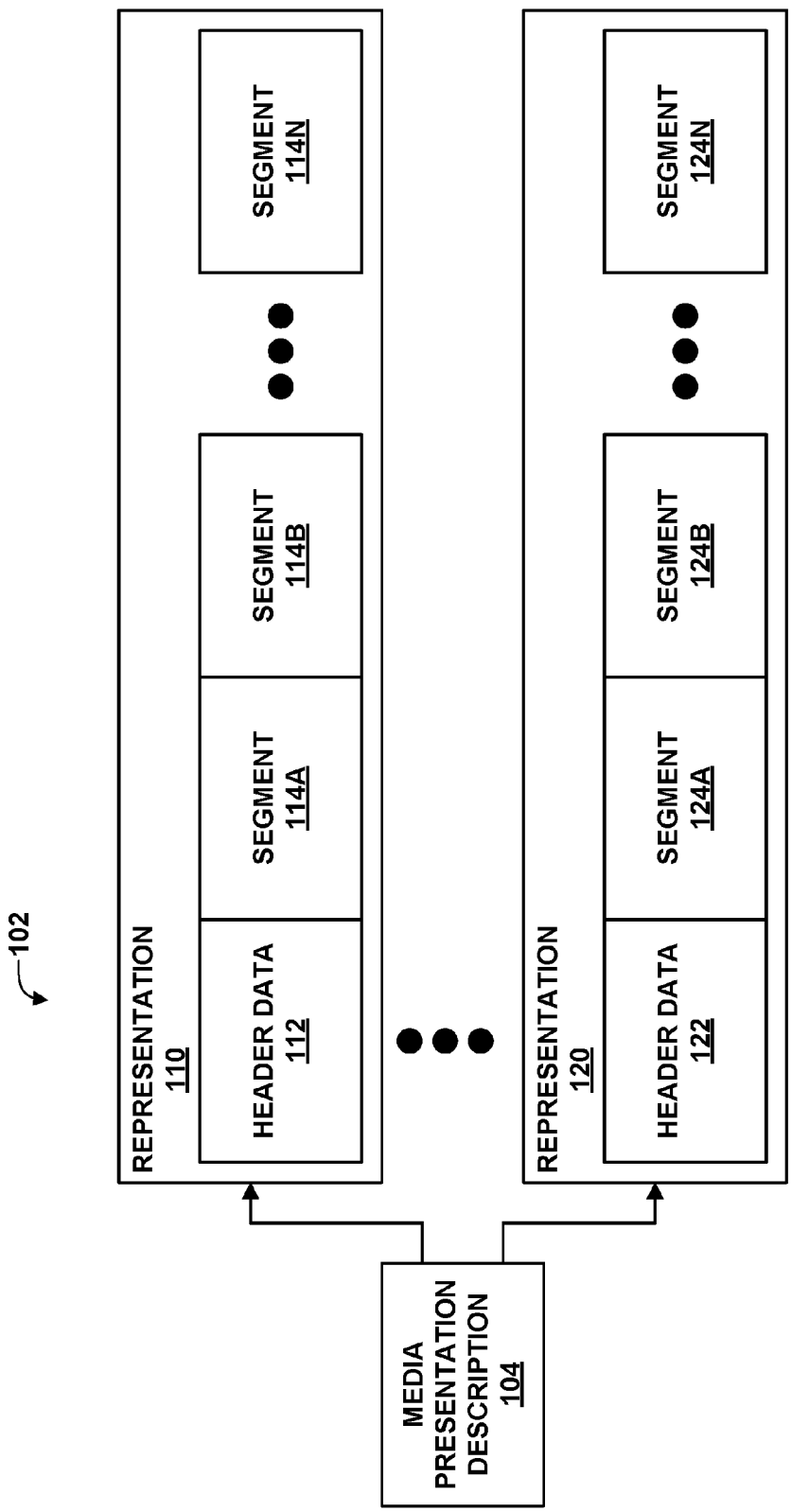
FIG. 3 is a conceptual diagram illustrating elements of an example multimedia content.

FIG. 3 is a conceptual diagram illustrating elements of an example multimedia content 102. Multimedia content 102 may correspond to multimedia content 64 (FIG. 1), or another multimedia content stored in memory 62. In the example of FIG. 3, multimedia content 102 includes media presentation description (MPD) 104 and a plurality of representations 110-120. Representation 110 includes optional header data 112 and segments 114A-114N (segments 114), while representation 120 includes optional header data 122 and segments 124A-124N (segments 124). The letter N is used to designate the last movie fragment in each of representations 110, 120 as a matter of convenience. In some examples, there may be different numbers of movie fragments between representations 110, 120.

MPD 104 may comprise a data structure separate from representations 110-120. MPD 104 may correspond to manifest file 66 of FIG. 1. Likewise, representations 110-120 may correspond to representations 68 of FIG. 1. In general, MPD 104 may include data that generally describes characteristics of representations 110-120, such as coding and rendering characteristics, adaptation sets, a profile to which MPD 104 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 112, when present, may describe characteristics of segments 114, e.g., temporal locations of random access points, which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 104.

Segments 114 include one or more coded video samples, each of which may include frames or slices of video data. Each of the coded video samples of segments 114 may have similar characteristics, e.g., height, width, and bandwidth requirements. Such characteristics may be described by data of MPD 104, though such data is not illustrated in the example of FIG. 3. MPD 104 may include characteristics as described by the 3GPP Specification, with the addition of any or all of the signaled information described in this disclosure.

Each of segments 114, 124 may be associated with a unique uniform resource identifier (URI), e.g., a uniform resource locator (URL). Thus, each of segments 114, 124 may be independently retrievable using a streaming network protocol, such as DASH. In this manner, a destination device, such as client device 40, may use an HTTP Get request to retrieve segments 114 or 124. In some examples, client device 40 may use HTTP partial Get requests to retrieve specific byte ranges of segments 114 or 124.

Figure 4:
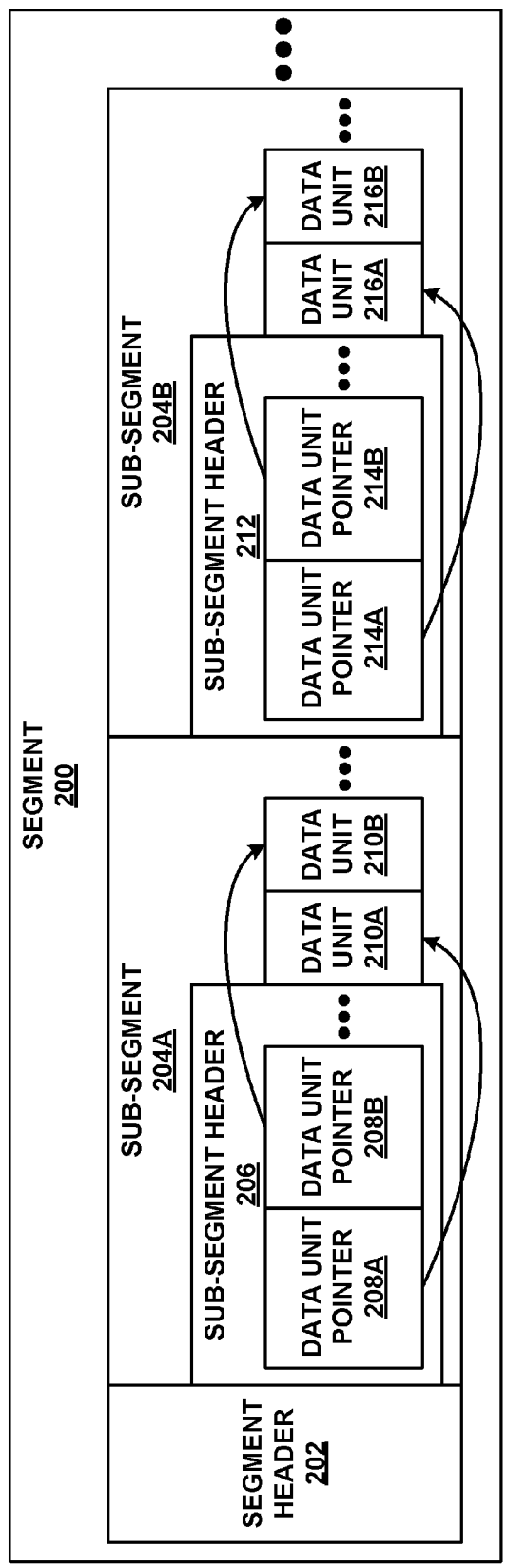
FIG. 4 is a block diagram illustrating an example segment of video data, according to aspects of this disclosure.

According to aspects of this disclosure, each of segments 114, 124 may be further divided into a plurality of sub-segments, as shown and described with respect to FIG. 4. After multimedia content 102 has been fully formed, header data 112, 122 may, in some examples, include pointers to particular NAL units, such as IDR NAL units, as discussed above. However, when sub-segments of representations 110, 120 are transmitted once the sub-segments are prepared, in accordance with the techniques of this disclosure, it should be understood that header data 112, 122 may not be available until after segments 114, 124 have been fully formed. Nevertheless, as discussed in this disclosure, data of sub-segments of segments 114, 124 may be transmitted before header data 112, 122 is available.

FIG. 4 is a conceptual diagram illustrating an example segment 200, according to aspect of this disclosure. Segment 200 may correspond to segments 114 and/or 124 shown in FIG. 3, and may comprise at least a portion of multimedia content 64 (FIG. 1), or another multimedia content stored in memory 62. While certain aspects of FIG. 4 may be described with respect to the components shown in FIG. 1, it should be understood that segment 200 may be implemented in a number of different environments having a number of different components.

In the example of FIG. 4, segment 200 includes segment header 202, sub-segment 204A, sub-segment 204B (referred to collectively as sub-segments 204), as well as potentially a number of additional sub-segments (indicated by ellipsis). According to aspects of this disclosure, segment header 202 may include information common to all sub-segments 204 of segment 200. For example, segment header 202 may include certain information to assist a device, such as client device 40, in decoding and/or rendering segment 200. That is, segment header 202 may include data that indicates an encoding format for audio data of the segment 200, an encoding format for video data of the segment 200, a bitrate for the segment 200, a quality level for the segment 200, a resolution of the video data of the segment 200, a frame rate of the video data of the segment 200, and the like. According to some aspects of this disclosure, a portion of such data may be included in a sub-segment header, as described below. In some examples, segment header 202 is transmitted after all sub-segments 204 have been transmitted. In other examples, segment header 202 is transmitted before sub-segments 204 have been transmitted.

In some examples, according to aspects of this disclosure, segment header 202 may include a flag that indicates whether the data of segment header 202 has changed. That is, a segment header flag may indicate whether data of segment header 202 has changed from a previously received and decoded segment header. A device, such as sever device 60, may set a segment header flag to "0" to indicate that the data of segment header 202 has not changed, and may set the segment header flag to "1" to indicate that the data of the segment header has changed. In the event that the header data has not changed (flag=0), server device 60 may omit inclusion of additional information in segment header 202. Alternatively, in the event that the header data has changed (flag=1), sever device 60 may include the header data after the segment header flag.

In the example shown in FIG. 4, sub-segment 204A includes sub-segment header 206 having data unit pointers 208A and 208B (collectively, data unit pointers 208) that identify the relative location of data units 210A and 210B (collectively, data units 210), respectively. In some examples, sub-segment header 206 may include a portion of the data described above with respect to segment header 202. Data that does not frequently change, however, is not typically included sub-segment header 206 (e.g., such as encoding format).

According to some aspects of this disclosure, sub-segment header 206 includes a table of data unit pointers 208 that identify an offset of each of the data units 210 within sub-segment 204A. For example, the offset may provide the relative position of the data units within the sub-segment 204A. The offset may also provide an indication of the appropriate order in which to present decoded data of the data unit (although in some examples data units may not be encoded and transmitted in presentation/display order).

Data units 210 generally include non-VCL NAL units or VCL NAL units, which may include encoded media data. In an example in which the media data is video data, data units 210 may include frames or slices of video data. According to aspects of this disclosure, a sub-segment, such as sub-segments 204A, may not be independently decodable. For example, one or more of data units 210 may refer to one or more data units contained in one or more other sub-segments (e.g., such as data units 216 of sub-segment 204B). That is, in an example in which data units 210 include video data, one or more of data units 210 may be encoded as a P-frame or a B-frame that references video data of one or more data units contained in one or more other sub-segments, e.g., using motion vectors that identify predictive data of the other sub-segments. In this manner, motion vectors represent examples of references from a data unit of one sub-segment to a data unit of another sub-segment. Other types of references are also possible, such as displacement vectors, scalable video coding (SVC) techniques, syntactic prediction for predicting syntax elements, or other such references. Thus, in some examples, one or more of data units 210 may refer to a future sub-segment (e.g., a B-frame). Data units 210, however, may also contain certain information that is independently decodable (e.g., without reference to other sub-segments). For example, one or more of data units 210 may be I-frames of video data that are independently decodable.

In the example shown in FIG. 4, sub-segment 204B is configured similarly to sub-segment 204A. That is, sub-segment 204B includes sub-segment header 212 that has data unit pointers 214A and 214B that identify data units 216A and 216B. In some examples, according to aspects of this disclosure, similar to segment header 202 described above, sub-segments 204 may include a flag that indicates whether the data of sub-segment header 206, 212 has changed. In the example shown in FIG. 4, sub-segment header 212 may include a flag that indicates whether data of the previously received sub-segment header 206 has changed (e.g., flag=0, data has not changed; flag=1, data has changed). Accordingly, in examples in which sub-segment header data does not change, the number of bits consumed by header data can be reduced.

Utilizing segment 200 in accordance with the techniques described herein can result in reduced latency (e.g., compared to a segment that does not include a plurality of sub-segments). That is, according to aspects of this disclosure a device responsible for transmitting a segment over a network, such as sever device 60 or content preparation device 20 (or a device implementing functionality of both server device 60 and content preparation device 20), may transmit sub-segment 204A as soon as sub-segment 204A has been formed (e.g., as soon as the last data unit of sub-segment 204A is received/encoded). That is, server device 60 does not have to wait for multiple sub-segments to be formed prior to transmitting sub-segment 204A. Moreover, server device 60 does not have to wait for segment header 202 to be completed prior to transmitting sub-segment 204A.

Transmitting sub-segments 204 as soon as the sub-segments 204 have been formed/encoded may reduce latency, because a client device, such as client device 40, may immediately start decoding at least a portion of sub-segments 204 upon receiving sub-segments 204. That is, in the example shown in FIG. 4, while certain data units 210 of sub-segment 204A may reference one or more of data units 216 of sub-segment 204B, a client device may immediately start decoding some of the data units 210 of sub-segment 204A (e.g., I-frames contained in sub-segment 204A). Moreover, client device 40 is ready to decode and play out the entire segment 200 upon receiving the segment header 202 for the segment 200, which typically follows the sub-segments 204A, 204B. That is, client device 40 has already received and the sub-segments 204A and 204B and is ready to begin decoding immediately upon receiving segment header 202.

In accordance with the techniques of this disclosure, in an example, segment 200 may be arranged according to Table 2, shown below:

TABLE 2

SEGMENT HEADER WITH SUB-SEGMENTS

Header
    Fixed Table Header
    Sub-segment Header 1
        Offset to Data Unit 1
        Offset to Data Unit 2
    Data Unit 1
    Data Unit 2
    Sub-segment Header 2
        Offset to Data Unit 3
        Offset to Data Unit 4
    Data Unit 3
    Data Unit 4

According to some aspects of this disclosure, segment 200 may be configured for transmitting multimedia data in accordance with DASH or other streaming network protocols via a broadcast network transmission. For example, server device 60 may prepare segment 200 having a plurality of sub-segments 204 for transmission to one or more client devices 40 via broadcast. Client device 40 may, in some examples, receive a broadcast network transmission that includes sub-segments 204 of segment 200, as discussed above.

While FIG. 4 illustrates sub-segments 204A and 204B as being similarly configured, it should be understood that in some examples, segments of a representation may not include similarly configured segments. For example, a representation may include one or more segments that have been divided into sub-segments, as well as one or more sub-segments that are not divided.

Figure 5:
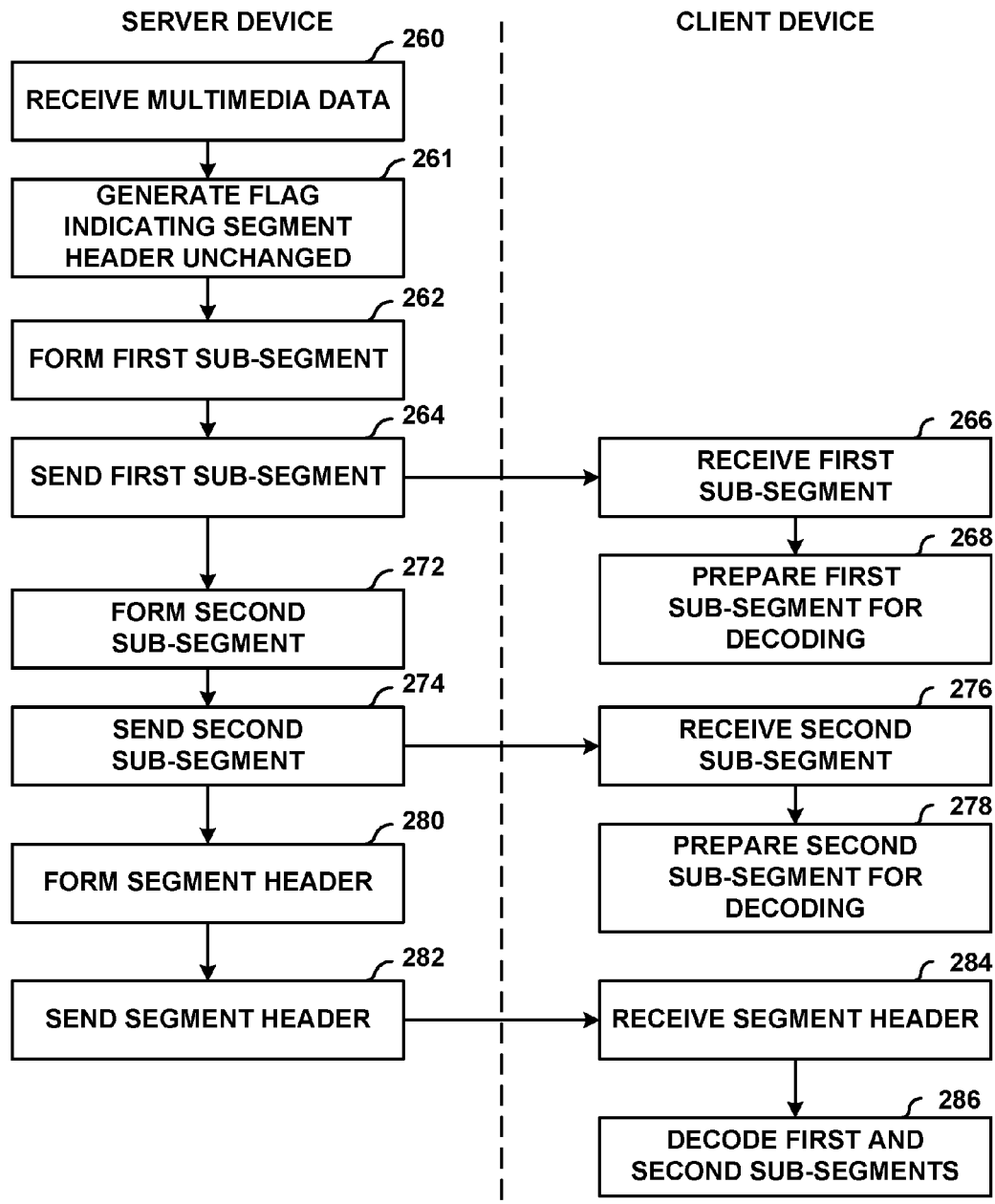
FIG. 5 is a flowchart illustrating an example method for performing techniques of this disclosure.

FIG. 5 is a flowchart illustrating an example method according to the techniques described in this disclosure. Although the method of FIG. 5 is described with respect to content preparation device 20 and client device 40 (FIG. 1), it should be understood that other devices may implement techniques similar to those of the method of FIG. 5. For example, server device 60, or one or more network devices of a content delivery network, may perform some or all of the functions attributed to server device 60.

Content preparation device 20 (which may be generally referred to as a "server device" in that it may provide content to a client device) may initially obtain data for a representation of multimedia content (260). More specifically, content preparation device 20 may obtain a segment of media data for a given representation of multimedia content. According to some aspects of this disclosure, content preparation device 20 may generate a flag that indicates whether header data associated with the segment of media data has changed (261). That is, content preparation device 20 may indicate whether header data of the segment is different than header data of a previously encoded segment (if such a segment exists). Content preparation device 20 may set a segment header flag to a value of "0" to indicate that header data is unchanged, or may set a segment header flag to a value of "1" to indicate that header data is different (e.g., followed by the appropriate header data).

Content preparation device 20 may then form a first sub-segment (262). For example, content preparation device 20 may form a sub-segment similar to sub-segments 204 shown in FIG. 4, having a sub-segment header that includes data unit pointers identifying one or more data units contained in the first sub-segment. In addition, as noted above, the sub-segment may not be independently decodable. That is, the first sub-segment may include one or more data units that reference one or more data units of one or more other sub-segments (as well as future sub-segments, such as the second sub-segment described below).

Once formed, content preparation device 20 sends the first sub-segment to client device 40 (264). According to an aspect of this disclosure, content preparation device 20 may broadcast the first sub-segment (as well as following sub-segments). After content preparation device 20 has transmitted the first sub-segment, client device 40 receives the first sub-segment (266). In some examples, client device 40 may prepare the first sub-segment for decoding (268). For example, client device 40 may buffer or otherwise prepare the first sub-segment for decoding such that the first sub-segment may be decoded immediately upon receiving segment header data.

In addition, content preparation device 20 forms the second sub-segment (272). The second sub-segment may be formed in a manner similar to the first sub-segment described above. After formation, content preparation device 20 may send the second sub-segment (with sub-segment header data) to client device 40 (274). Client device 40 then receives the second sub-segment (276). In some examples, client device 40 may prepare the second sub-segment for decoding in a manner similar to that described above with respect to the first sub-segment (278).

After forming and transmitting the second sub-segment, content preparation device 20 may form a segment header that is applicable to all of the sub-segments (e.g., in the example shown in FIG. 5, the first and second sub-segments)

(280). Content preparation device 20 may also send the segment header to client device 40 (282). Client device 40 may then receive the segment header (284) and decode the first and second sub-segments (286). That is, client device 40 may decode each of the previously received sub-segments.

In this manner, the method of FIG. 5 represents an example of a method including receiving a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The method also includes, after receiving the first sub-segment, receiving the second sub-segment, the second sub-segment comprising a second set of one or more data units and a second header including data indicative of locations of the data units within the second sub-segment, and processing the segment after receiving the first sub-segment and the second sub-segment.

In addition, the method of FIG. 5 represents an example of a method including sending a first sub-segment of a segment of multimedia data, the first sub-segment comprising a first set of one or more data units and a first header including data indicative of locations of the data units within the first sub-segment, wherein at least one of the data units refers to a data unit of a second sub-segment of the segment. The method also includes, after sending the first sub-segment, sending the second sub-segment, the second sub-segment comprising a second set of one or more data units and a second header including data indicative of locations of the data units within the second sub-segment.

It should also be understood that the steps shown and described with respect to FIG. 5 are provided as merely one example. That is, the steps of the method of FIG. 5 need not necessarily be performed in the order shown in FIG. 5, and fewer, additional, or alternative steps may be performed. In an example, the method shown and described with respect to FIG. 5 includes first and second sub-segments. In other examples, however, a server device may prepare (and a client device may receive) more than two sub-segments of media data.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising: sending, before a Dynamic Adaptive Streaming over HTTP segment is fully formed, a first sub-segment of the Dynamic Adaptive Streaming over HTTP segment, the first sub-segment comprising a first set of one or more coded media samples;
   sending, before the Dynamic Adaptive Streaming over HTTP segment is fully formed, a second sub-segment of the Dynamic Adaptive Streaming over HTTP segment, the second sub-segment comprising a second set of one or more coded media samples;
   a header of the Dynamic Adaptive Streaming over HTTP segment, to include information configured to facilitate decoding the first set of one or more coded media samples and the second set of one or more coded media samples, the information configured to facilitate decoding the first set of one or more coded media samples and the second set of one or more coded media samples comprising information indicative of at least one of:

an offset to at least one coded media sample of the first set of one or more coded media samples; or an offset to at least one coded media sample of the second set of one or more coded media samples; and sending the header of the Dynamic Adaptive Streaming over HTTP segment.

2. The method of claim 1, wherein at least one coded media sample of the first set of one or more coded media samples of the first sub-segment refers to at least one coded media sample of the second set of one or more coded media samples of the second sub-segment.

3. The method of claim 2, further comprising:

encoding the at least one coded media sample of the first set of one or more coded media samples of the first sub-segment relative to the at least one coded media sample of the second set of one or more coded media samples of the second sub-segment;

wherein sending the first sub-segment comprises sending the first sub-segment before finishing encoding the second set of one or more coded media samples of the second sub-segment.

4. The method of claim 1, further comprising:

generating the header of the Dynamic Adaptive Streaming over HTTP segment to include information indicative of at least one of an encoding format for audio data of the segment, an encoding format for video data of the segment, a bitrate for the segment, a quality level for the segment, a resolution of the video data of the segment, or a frame rate of the video data of the segment.

5. An apparatus comprising one or more processors configured to: send, before a Dynamic Adaptive Streaming over HTTP segment is fully formed, a first sub-segment of the Dynamic Adaptive Streaming over HTTP segment, the first sub-segment comprising a first set of one or more coded media samples;

send, before the Dynamic Adaptive Streaming over HTTP segment is fully formed, a second sub-segment of the Dynamic Adaptive Streaming over HTTP segment, the second sub-segment comprising a second set of one or more coded media samples;

a header of the Dynamic Adaptive Streaming over HTTP segment, to include information configured to facilitate decoding the first set of one or more coded media samples and the second set of one or more coded media samples, the information configured to facilitate decoding the first set of one or more coded media samples and the second set of one or more coded media samples comprising information indicative of at least one of:

an offset to at least one coded media sample of the first set of one or more coded media samples; or an offset to at least one coded media sample of the second set of one or more coded media samples; and send the header of the Dynamic Adaptive Streaming over HTTP segment.

6. The apparatus of claim 5, wherein at least one coded media sample of the first set of one or more coded media samples of the first sub-segment refers to at least one coded media sample of the second set of one or more coded media samples of the second sub-segment.

7. The apparatus of claim 6, wherein the one or more processors are further configured to: encode the at least one coded media sample of the first set of one or more coded media samples of the first sub-segment relative to the at least one coded media sample of the second set of one or more coded media samples of the second sub-segment;

wherein sending the first sub-segment comprises sending the first sub-segment before finishing encoding the second set of one or more coded media samples of the second sub-segment.

8. The apparatus of claim 5, wherein the one or more processors are further configured to: generate the header of the Dynamic Adaptive Streaming over HTTP segment to include information indicative of at least one of an encoding format for audio data of the segment, an encoding format for video data of the segment, a bitrate for the segment, a quality level for the segment, a resolution of the video data of the segment, or a frame rate of the video data of the segment.

9. A non-transitory computer-readable medium having stored thereon instructions that, when executed, cause one or more processors to perform operations comprising:

sending, before a Dynamic Adaptive Streaming over HTTP segment is fully formed, a first sub-segment of the Dynamic Adaptive Streaming over HTTP segment, the first sub-segment comprising a first set of one or more coded media samples;

sending, before the Dynamic Adaptive Streaming over HTTP segment is fully formed, a second sub-segment of the Dynamic Adaptive Streaming over HTTP segment, the second sub-segment comprising a second set of one or more coded media samples;

generating a header of the Dynamic Adaptive Streaming over HTTP segment, the header of the Dynamic Adaptive Streaming over HTTP segment comprising information configured to facilitate decoding the first set of one or more coded media samples, the information configured to facilitate decoding the first set of one or more coded media samples and the second set of one or more coded media samples comprising information indicative of at least one of:

an offset to at least one coded media sample of the first set of one or more coded media samples; or an offset to at least one coded media sample of the second set of one or more coded media samples; and sending the header of the Dynamic Adaptive Streaming over HTTP segment.

10. The non-transitory computer-readable medium of claim 9, wherein at least one coded media sample of the first set of one or more coded media samples of the first sub-segment refers to at least one coded media sample of the second set of one or more coded media samples of the second sub-segment.

11. The non-transitory computer-readable medium of claim 10, wherein the operations further comprise:

encoding the at least one coded media sample of the first set of one or more coded media samples of the first sub-segment relative to the at least one coded media sample of the second set of one or more coded media samples of the second sub-segment;

wherein sending the first sub-segment comprises sending the first sub-segment before finishing encoding the second set of one or more coded media samples of the second sub-segment.

12. The non-transitory computer-readable medium of claim 9, wherein the operations further comprise:

generating the header of the Dynamic Adaptive Streaming over HTTP segment to include information indicative of at least one of an encoding format for audio data of the segment, an encoding format for video data of the segment, a bitrate for the segment, a quality level for the segment, a resolution of the video data of the segment, or a frame rate of the video data of the segment.

13. An apparatus comprising:
means for sending, before a Dynamic Adaptive Streaming over HTTP segment is fully formed, a first sub-segment of the Dynamic Adaptive Streaming over HTTP segment, the first sub-segment comprising a first set of one or more coded media samples;
means for sending, before the Dynamic Adaptive Streaming over HTTP segment is fully formed, a second sub-segment of the Dynamic Adaptive Streaming over HTTP segment, the second sub-segment comprising a second set of one or more coded media samples;
means for generating a header of the Dynamic Adaptive Streaming over HTTP segment, the header of the Dynamic Adaptive Streaming over HTTP segment comprising information configured to facilitate decoding the first set of one or more coded media samples, the information configured to facilitate decoding the first set of one or more coded media samples and the second set of one or more coded media samples comprising information indicative of at least one of:
an offset to at least one coded media sample of the first set of one or more coded media samples; or
an offset to at least one coded media sample of the second set of one or more coded media samples; and
means for sending the header of the Dynamic Adaptive Streaming over HTTP segment.

14. A method comprising:
receiving a first sub-segment of a Dynamic Adaptive Streaming over HTTP segment, the first sub-segment sent before the Dynamic Adaptive Streaming over HTTP segment was fully formed, the first sub-segment comprising a first set of one or more coded media samples;
receiving a second sub-segment of the Dynamic Adaptive Streaming over HTTP segment, the second sub-segment sent before the Dynamic Adaptive Streaming over HTTP segment was fully formed, the second sub-segment comprising a second set of one or more coded media samples;
receiving a header of the Dynamic Adaptive Streaming over HTTP segment, the header of the Dynamic Adaptive Streaming over HTTP segment comprising information configured to facilitate decoding the first set of one or more coded media samples and the second set of one or more coded media samples, wherein the information of the header of the Dynamic Adaptive Streaming over HTTP segment comprises information indicative of at least one of:
an offset to at least one coded media sample of the first set of one or more coded media samples; or
an offset to at least one coded media sample of the second set of one or more coded media samples; and
decoding the first set of one or more coded media samples and the second set of one or more coded media samples.

15. The method of claim 14, wherein at least one coded media sample of the first set of one or more coded media samples of the first sub-segment was encoded relative to at least one coded media sample of the second set of one or more coded media samples of the second sub-segment.

16. The method of claim 14, wherein the information of the header of the Dynamic Adaptive Streaming over HTTP segment comprises information indicative of at least one of an encoding format for audio data of the segment, an encoding format for video data of the segment, a bitrate for the segment, a quality level for the segment, a resolution of the video data of the segment, or a frame rate of the video data of the segment.

17. An apparatus comprising one or more processors configured to:
receive a first sub-segment of a Dynamic Adaptive Streaming over HTTP segment, the first sub-segment sent before the Dynamic Adaptive Streaming over HTTP segment was fully formed, the first sub-segment comprising a first set of one or more coded media samples;
receive a second sub-segment of the Dynamic Adaptive Streaming over HTTP segment, the second sub-segment sent before the Dynamic Adaptive Streaming over HTTP segment was fully formed, the second sub-segment comprising a second set of one or more coded media samples;
receive a header of the Dynamic Adaptive Streaming over HTTP segment, the header of the Dynamic Adaptive Streaming over HTTP segment comprising information configured to facilitate decoding the first set of one or more coded media samples and the second set of one or more coded media samples, wherein the information of the header of the Dynamic Adaptive Streaming over HTTP segment comprises information indicative of at least one of:
an offset to at least one coded media sample of the first set of one or more coded media samples; or
an offset to at least one coded media sample of the second set of one or more coded media samples; and
decode the first set of one or more coded media samples and the second set of one or more coded media samples.

18. The apparatus of claim 17, wherein at least one coded media sample of the first set of one or more coded media samples of the first sub-segment was encoded relative to at least one coded media sample of the second set of one or more coded media samples of the second sub-segment.

19. The apparatus of claim 17, wherein the information of the header of the Dynamic Adaptive Streaming over HTTP segment comprises information indicative of at least one of an encoding format for audio data of the segment, an encoding format for video data of the segment, a bitrate for the segment, a quality level for the segment, a resolution of the video data of the segment, or a frame rate of the video data of the segment.

20. A non-transitory computer-readable medium having stored thereon instructions that, when executed, cause one or more processors to perform operations comprising:
receiving a first sub-segment of a Dynamic Adaptive Streaming over HTTP segment, the first sub-segment sent before the Dynamic Adaptive Streaming over HTTP segment was fully formed, the first sub-segment comprising a first set of one or more coded media samples;
receiving a second sub-segment of the Dynamic Adaptive Streaming over HTTP segment, the second sub-segment sent before the Dynamic Adaptive Streaming over HTTP segment was fully formed, the second sub-segment comprising a second set of one or more coded media samples;
receiving a header of the Dynamic Adaptive Streaming over HTTP segment, the header of the Dynamic Adaptive Streaming over HTTP segment comprising information configured to facilitate decoding the first set of one or more coded media samples and the second set of one or more coded media samples, wherein the information of the header of the Dynamic Adaptive Streaming over HTTP segment comprises information indicative of at least one of:

an offset to at least one coded media sample of the first set of one or more coded media samples; or an offset to at least one coded media sample of the second set of one or more coded media samples; and decoding the first set of one or more coded media samples and the second set of one or more coded media samples.

21. The non-transitory computer-readable medium of claim 20, wherein at least one coded media sample of the first set of one or more coded media samples of the first sub-segment was encoded relative to at least one coded media sample of the second set of one or more coded media samples of the second sub-segment.

22. The non-transitory computer-readable medium of claim 20, wherein the information of the header of the Dynamic Adaptive Streaming over HTTP segment comprises information indicative of at least one of an encoding format for audio data of the segment, an encoding format for video data of the segment, a bitrate for the segment, a quality level for the segment, a resolution of the video data of the segment, or a frame rate of the video data of the segment.

23. An apparatus comprising:

means for receiving a first sub-segment of a Dynamic Adaptive Streaming over HTTP segment, the first sub-segment sent before the Dynamic Adaptive Streaming over HTTP segment was fully formed, the first sub-segment comprising a first set of one or more coded media samples;

means for receiving a second sub-segment of the Dynamic Adaptive Streaming over HTTP segment, the second sub-segment sent before the Dynamic Adaptive Streaming over HTTP segment was fully formed, the second sub-segment comprising a second set of one or more coded media samples;

means for receiving a header of the Dynamic Adaptive Streaming over HTTP segment, the header of the Dynamic Adaptive Streaming over HTTP segment comprising information configured to facilitate decoding the first set of one or more coded media samples and the second set of one or more coded media samples, wherein the information of the header of the Dynamic Adaptive Streaming over HTTP segment comprises information indicative of at least one of:

an offset to at least one coded media sample of the first set of one or more coded media samples; or an offset to at least one coded media sample of the second set of one or more coded media samples; and means for decoding the first set of one or more coded media samples and the second set of one or more coded media samples.

* * * * *